United States Patent [19]

Bou et al.

[11] Patent Number: 5,728,368
[45] Date of Patent: Mar. 17, 1998

[54] CHEMICAL HEAT PUMP REACTOR WITH IMPROVED POWER

[75] Inventors: Pierre Bou, Soisy Sous Mongmorency; Michel Moreau, Clichy; Philippe Prades, Perpignan, all of France

[73] Assignee: Le Carbone Lorraine, Courbevoie, France

[21] Appl. No.: 509,724

[22] Filed: Aug. 1, 1995

[30] Foreign Application Priority Data

Aug. 2, 1994 [FR] France .................. 94 09829

[51] Int. Cl.⁶ .................................................. F28D 21/00
[52] U.S. Cl. .................. 423/659; 422/198; 422/202; 422/203
[58] Field of Search .................. 423/659; 422/198, 422/202, 203

[56] References Cited

U.S. PATENT DOCUMENTS

| | | | |
|---|---|---|---|
| 1,841,762 | 1/1932 | Samesreuther et al. | 422/202 |
| 1,854,589 | 4/1932 | Keves . | |
| 2,384,460 | 9/1945 | Kleen . | |
| 2,386,390 | 10/1945 | Fernelius et al. | 422/202 |
| 3,438,720 | 4/1969 | Cleaver | 422/198 |
| 4,135,371 | 1/1979 | Kesslring et al. . | |
| 4,367,079 | 1/1983 | Wallsten . | |
| 4,674,563 | 6/1987 | Maier-Laxhuber et al. . | |
| 5,298,231 | 3/1994 | Rockenfeller | 423/299 |
| 5,336,520 | 8/1994 | Hoenig | 423/448 |

FOREIGN PATENT DOCUMENTS

| | | |
|---|---|---|
| 0588050 | of 0000 | Germany . |
| 9010491 | 9/1990 | WIPO . |
| 9115297 | 10/1991 | WIPO . |

Primary Examiner—Wayne Langel
Attorney, Agent, or Firm—Dennison, Meserole, Pollack & Scheiner

[57] ABSTRACT

A reactor for a chemical heat pump including a sealed container provided with a heating and cooling system and having an inside wall, and a solid reagent having an outer surface and disposed in the container, which solid reagent reacts reversibly with a reagent gas inside the container, the solid reagent having dimensions such that a space is defined between the outer surface of the solid reagent and the inside wall of the container. A fluid contact material occupies at least part of the space, the fluid contact material being a good conductor of heat and chemically inert relative to the solid reagent.

13 Claims, 4 Drawing Sheets

CHEMICAL HEAT PUMP REACTOR WITH IMPROVED POWER

FIELD OF THE INVENTION

The present invention relates to chemical heat pump reactors.

DESCRIPTION OF RELATED ART

The principle of chemical heat pumps, which is well known (see French Patents 2,547,512, 2,548,340 and 2,582, 790) utilizes the reversible thermal chemical reactions between a solid reagent and a reagent gas, such as the following:

Reaction 1 is exothermic; that is, it produces heat. The opposite reaction 2 is endothermic; that is, it absorbs heat.

The solid reagent is generally a mixture of a reagent salt, such as $MnCl_2$, $NiCl_2$, $SrCl_2$, $BaCl_2$, $SrBr_2$, etc., and a substrate material, such as a expanded natural graphite. The reagent gas is chosen from among those that react reversibly with the reactive salt, such as ammonia ($NH_3$). The solid reagent is placed in a reactor, whose wall is the site of thermal transfers with the solid reagent, that is, the recovery or introduction of thermal energy at the time of the synthesis reaction (reaction 1) or regeneration (or decomposition) reaction (reaction 2).

The reactor is generally a sealed container of stainless steel, provided with a heating and cooling system. The container of the reactor at the same time has a structural function, that is, it must be sealed, and must have a sufficient mechanical strength to withstand the high confinement pressures (>10 bars) that are inherent to reactor operation, and a heat transfer function, that is, it must assure the heat exchange between the solid reagent and the exterior of the heat pump.

It is understood that good operation of these reactors is a condition in particular of good thermal contact between the wall of the reactor and the solid reagent. For this reason, the solid reagent, which is generally in the form of solid cylindrical blocks, is typically packed in by force or by being crimped.

However, there are cases where despite this precaution, the initially good performance suffers over the course of the reaction cycles; that is, in the course of alternating between the synthesis reactions and the regeneration reactions, a delay in starting the synthesis reaction (FIG. 1, curve 10) appears, and hence a major loss of power of the reactor at the start (FIG. 1, curve 11). The power does not reach its maximum 12 until after quite a long time, on the order of an hour. This is true particularly under certain conditions, when the reagent gas is ammonia, the reagent is a chloride, and the substrate is natural expanded graphite. By way of example, when the reagent salt is $MnCl_2$, the phenomenon of loss of thermal contact occurs when the density of the block of natural expanded graphite, before the reagent salt is added (dG), is equal to 0.1 g/cm$^3$, and when the proportion of salt in the block of expanded graphite after addition of the salt (Ts) is greater than 45%.

The degradation in performance is ascribed to changes in volume of the solid reagent, which can occur during the synthesis and regeneration reactions. The molar volume of the product of the synthesis reaction (reaction 1) between the reagent salt and the reagent gas can in fact be greater than that of the reagent before the reaction, as is the case of the reaction between an anhydrous salt and ammonia. Thus the solid reagent block inflates in the first synthesis reaction and is compressed against the wall of the reactor. If the solid reagent is compressed beyond its elastic limit, it detaches from the wall of the reactor in the regeneration reaction (reaction 2), which causes the volume of the solid reagent to decrease. As a consequence, the thermal contact between the solid reagent and the wall of the reactor worsens each reaction cycle, until it is no longer assured except by gas convection, which substantially lowers the heat transfer coefficient at the wall (hsw<10 W/m$^2$·K) and causes a delay in startup of the next synthesis reaction and a major loss in power of the reactor.

SUMMARY OF THE INVENTION

Thus, the object of the invention is to eliminate the problem of the loss in power of the reactor that occurs over the course of the reaction cycles, by keeping the heat transfer coefficient between the solid reagent and the reactor wall at an elevated, stable value, that is, a value higher than 50 W/m$^2$·K, over the course of the synthesis and regeneration reaction cycles, regardless of the changes in volume of the solid reagent.

To achieve this and other objects, the invention provides a reactor for a chemical heat pump including a sealed container having a heating and cooling system and a solid reagent, characterized in that the dimensions of the solid reagents are such that there is a space between the surface of the solid reagent and the inside wall of the container, that a fluid contact material occupies all or part of the space, and that the fluid contact material is a good conductor of heat and is chemically inert relative to the solid reagent.

FIGS. 2a and 2b show a diagram of the reactor according to the invention, these figures showing two different steps in the cycle of syntheses and regeneration reactions.

The solid reagent generally rests on the bottom of the container of the reactor, but this choice is in no way limiting, and the solid reagent may be suspended or be separated from the bottom of the container. The mean distance D between any point on the lateral surface of the solid reagent and the inner wall of the reactor (FIG. 2a) is preferably between 1 and 10 mm. A very restricted space would not enable satisfactory filling, would reduce the thermal transfers and gas exchanges, and would limit the flowing of the fluid contact material. On the other hand, an overly large space would reduce the energy stored in the reactor, by reducing the quantity of solid reagent, and would also reduce the thermal transfers between the solid reagent and the reactor wall and hence would reduce the power of the reactor.

The fluid contact material is preferably a powdered heat conductor material, such as natural graphite in powder or pellet form, or metal in pellets or atomized. In the case of powdered graphite or graphite pellets, the apparent density is between 0.5 and 1.0 g/cm$^3$, and preferably between 0.6 and 0.8 g/cm$^3$.

The fluid contact material in powder form has the advantage of high porosity, which enables faster diffusion of the reagent gas than that enabled by the diffusors accommodated within the solid reagent. The mass transfer is thus improved.

The solid reagent may be provided with a device for confining the fluid contact material. This device makes it possible to limit the movements of the fluid contact material and in particular to prevent it from accumulating on top of the solid reagent, which would impede its return to the space between the solid reagent and the reactor wall when the solid reagent contracts. The confinement device also enables the reagent gas to gain easy access to the solid reagent. There are various ways of embodying the confinement device according to the invention. FIGS. 5a and 5b show two possible embodiments. The embodiment shown in FIG. 5a has the dual advantage of great simplicity and a very large opening, which facilitates the diffusion of the reagent gas. The embodiment shown in FIG. 5b has as its main advantage that it facilitates filling of the space between the solid reagent and the wall of the container with the fluid contact material.

As the examples show, it has been found that the reactor according to the invention rapidly attains a much higher power upon startup of the synthesis reaction, which remains quite high thereafter, and that this performance is maintained after a plurality of reaction cycles. This result is ascribed to the fact that the fluid contact material absorbs the variations in volume of the solid reagent by flowing in response to the confinement of the solid reagent, that is, by rising or falling along the wall in the course of the expansion or contraction of the solid reagent, while maintaining a sufficient thermal contact with the reactor wall, that is, hsw>50 W/m$^2$·K. Therefore, the energy given off rapidly dissipates regardless of the volume of the solid reagent, and hence, at any moment of the synthesis reaction. For the same reasons, the heat transfer coefficient is maintained during the opposite regeneration reaction.

Another advantage of the reactor according to the invention is the simplicity of its embodiment, which with the aid of readily available materials makes it possible to substantially improve the performance of the heat pump without making major modifications to the reactor of the prior art.

DESCRIPTION OF THE PREFERRED EMBODIMENTS

Figure 1:
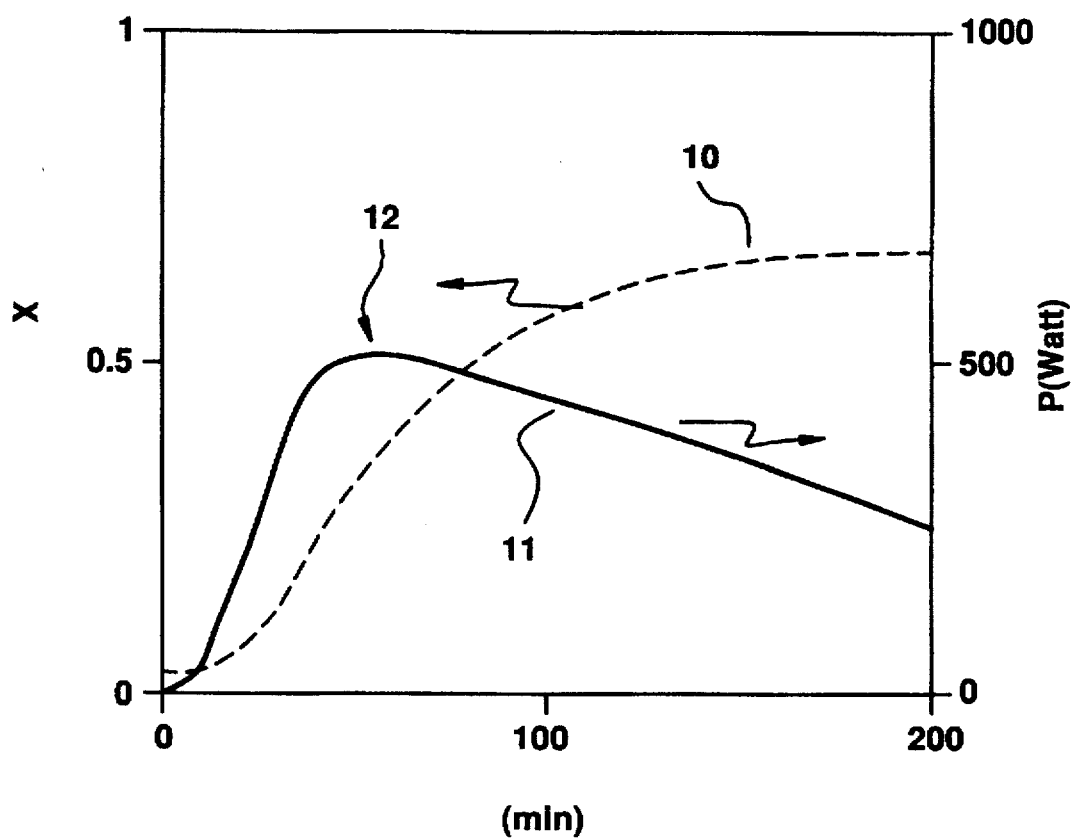
FIG. 1 is a graph of the kinetics of a synthesis reaction, showing degree of the proportion of a compound reacted and power generated vs. time.

FIG. 1 shows the kinetics of the synthesis reaction, that is, the progression of the synthesis reaction (X) as a function of time 10, and the power (P) that results 11, of a chemical heat pump provided with a reactor according to the prior art. The power begins at a very low level and does not reach its maximum 12 until after a very long time, on the order of an hour.

Figure 2A:
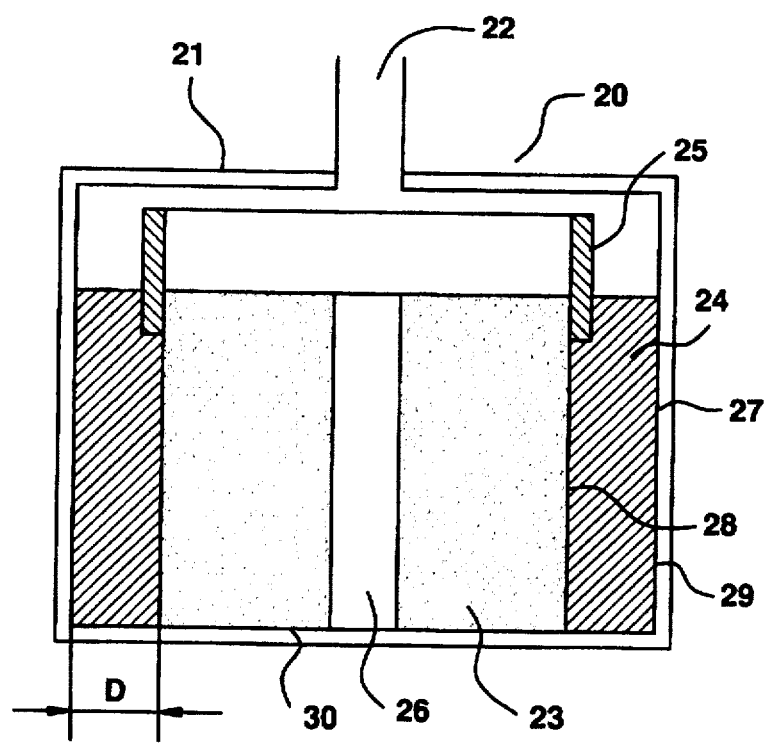
FIGS. 2a and 2b are schematic cross-sectional views of an apparatus according to the invention at two different stages of a process.
Figure 2B:
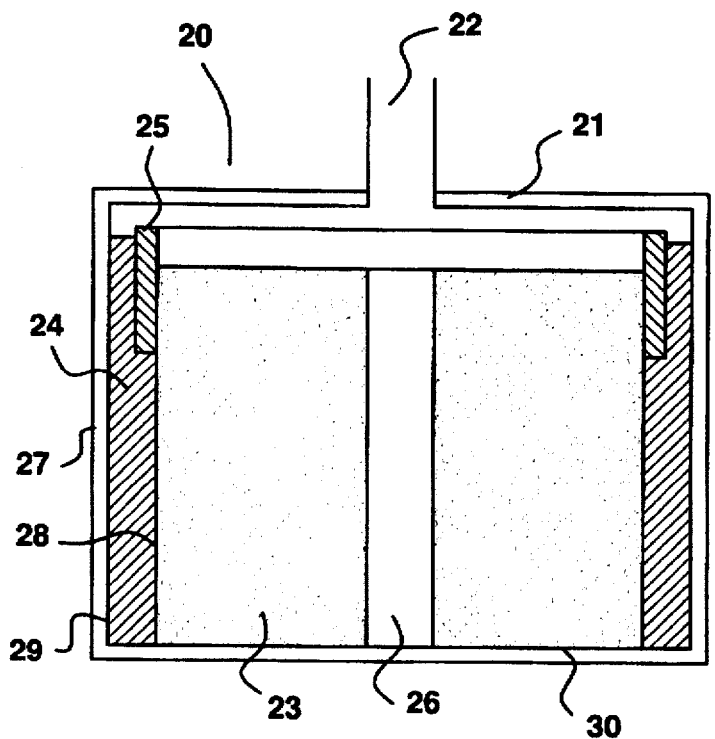

FIGS. 2a and 2b schematically show the heat pump reactor according to the invention for two different stages of the reaction cycle. A reactor 20, constituted by a sealed container 21 provided with an inlet for reagent gas 22, contains the solid reagent 23, the fluid contact material 24, and a device 25 for confining the fluid contact material. In the case illustrated here, a heat exchange fluid circulates inside the double wall 27 of the container. The heating system is not shown. A mean distance D separates any point of the lateral surface 28 of the solid reagent 23 from the inside surface 29 of the container 21. The solid reagent shown in these drawings rests on the bottom 30 of the container 21 and is provided with a diffusor 26 at its center, but the solid reagent may be disposed differently in the container and may have a plurality of diffusors.

FIG. 2a corresponds to the stage in the reaction cycle just before the synthesis reaction: the solid reagent occupies its minimum volume, and the contact material is at a low level. FIG. 2b corresponds to the stage in the reaction cycle at the end of the synthesis reaction: the solid reagent occupies its maximum volume, and the contact material is at a high level.

Figure 3:
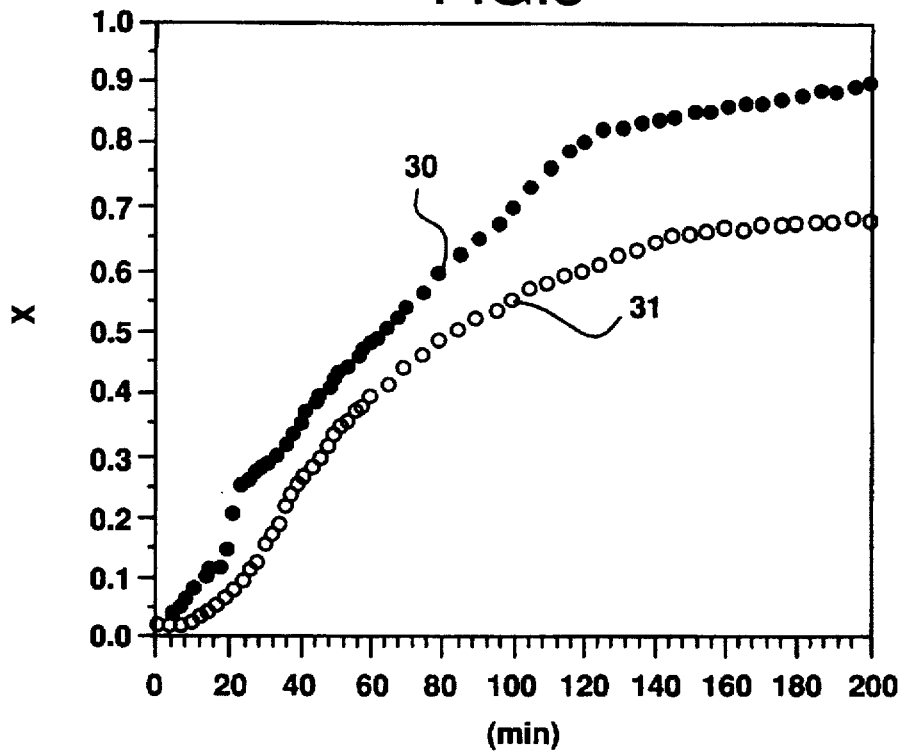
FIG. 3 is a graph of the kinetics of a reaction, showing the proportion of a compound reacted vs. time, for a reactor of the invention and a prior art reactor.

FIG. 3 compares the kinetics of a synthesis reaction, that is, the fraction of the solid reagent (X) that has reacted, as a function of time (in minutes), of a reactor 30 according to the invention with that of a reactor 31 according to the prior art. The synthesis begins at X=0 (0%) and is complete when X=1 (100%).

Figure 4:
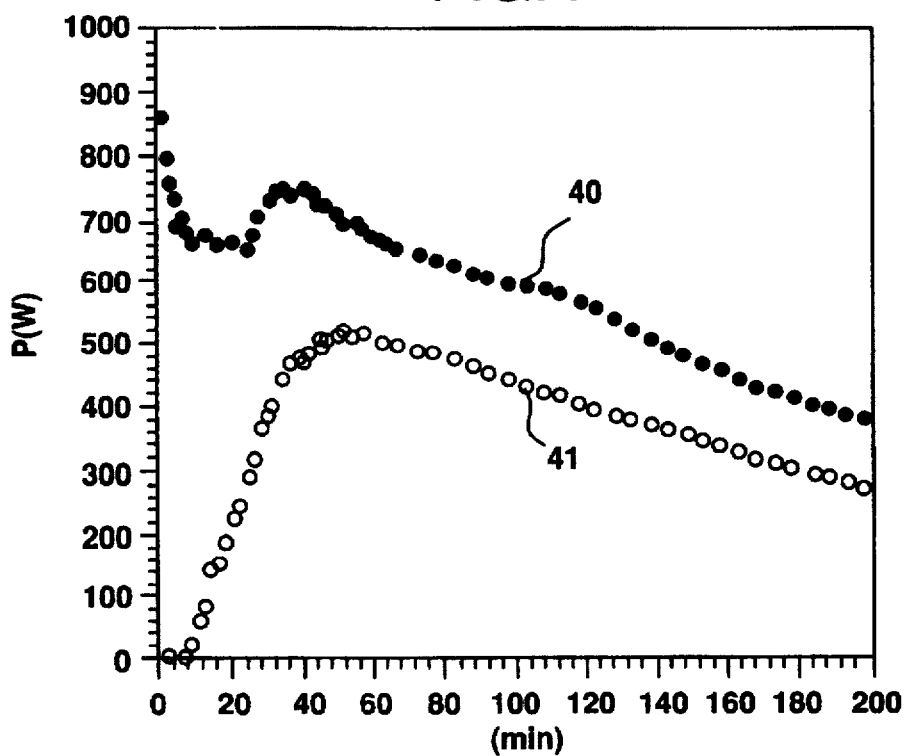
FIG. 4 is a graph of power generated vs. time for a reactor of the invention and a prior art reactor.

FIG. 4 compares the power P of a reactor 40 according to the invention with that of a reactor 41 of the prior art. The power (in watts) is measured as a function of time (in minutes).

Figure 5A:
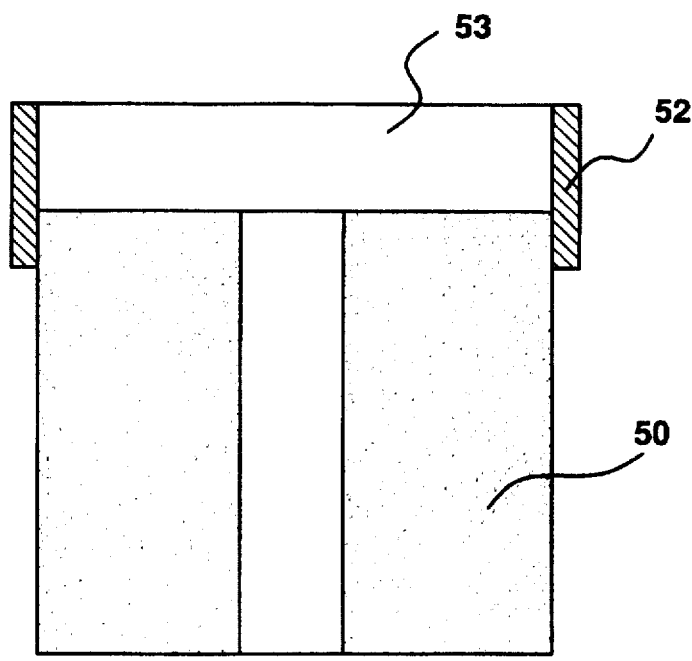
FIGS. 5a and 5b are schematic cross-sectional views of confinement devices according to the invention.
Figure 5B:
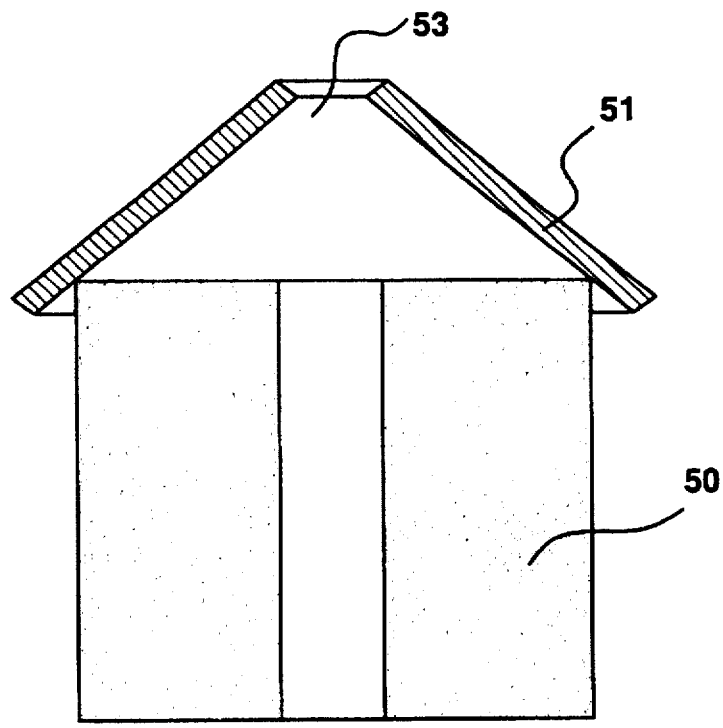

FIGS. 5a and 5b illustrate two embodiments of the confinement device according to the invention. In both cases, the confinement device is affixed to the upper part 50 of the solid reagent and has an opening 53 that facilitates the passage of the reagent gas. The confinement device 52 of FIG. 5a is cylindrical in shape. The confinement device 51 of FIG. 5b is in the form of a truncated cone.

EXAMPLES

Example 1

A reactor of the prior art was made and tested. To do so, a solid reagent cylinder 150 mm in diameter and 100 mm in height was made. Using expanded natural graphite and MnCl$_2$. The density (dG) of the expanded graphite was 0.11 g/cm$^3$, and the portion of the reagent salt (Ts) was 62%. The solid reagent cylinder was introduced by force into the container of a stainless steel reactor 150 mm in diameter and 200 mm in height.

The kinetics of the synthesis reaction were measured as a function of time over the course of a plurality of reaction cycles. The confinement pressure was 0.2 bar, and the different in temperature between the solid reagent and the reactor wall was 20° C. The curve 31 in FIG. 3 corresponds to the result obtained at the tenth cycle. A delay of about 10 minutes is observed before the startup of the synthesis reaction.

The power was also measured as a function of time. The result obtained at the tenth cycle is shown in the curve 41 in FIG. 4. From this, a heat transfer coefficient below 5 W/m$^2$·K is deduced.

Example 2

A reactor according to the invention was made and tested. To do so, a cylinder of solid reagent 140 mm in diameter and 100 mm in height was made, using the same materials, in the same proportions, as in Example 1. The solid reagent cylinder was introduced into the container of a stainless steel reactor 150 mm in diameter and 200 mm in height. A device for confining the fluid contact material, of cylindrical shape, was affixed to the upper face of the reagent.

Pellets of natural Madagascar graphite were then poured into the space between the reactor wall and the solid reagent, up to the top of the reagent. The apparent density of the pellets was between 0.68 and 1.0 g/cm$^3$.

The kinetics of the synthesis reaction and the power of this chemical heat pump were measured as a function of time, under the same conditions as in Example 1. The results obtained at the tenth cycle correspond to the curve 30 in FIG. 3 and the curve 40 in FIG. 4. From this, a heat transfer coefficient of 90 $W/m^2 \cdot K$ is deduced.

Hence a virtually immediate startup of the synthesis reaction is observed. The fact that the progression of the reaction under limiting mass transfer conditions, in this case a confinement pressure of 0.2 bar at the end of the regeneration step, is no longer limited to X=0.6 (60%) but rather to X=0.9 (90%) for a reaction time of 200 minutes can be imputed to the fact that the porosity of the solid reagent is maintained and the solid reagent is not redensified by the wall in the cycle of synthesis reactions. An available power that is always markedly higher than that obtained with the chemical heat pump of the prior art, especially in the first 40 minutes, is also observed.

It has also been confirmed that this performance is also maintained over the course of a plurality of reaction cycles.

What is claimed is:

1. A reactor for a chemical heat pump comprising a sealed container including an inside wall defining a reaction chamber, a heat exchange means in communication with said inside wall, a solid reagent having an outer surface disposed in said reaction chamber and having dimensions so as to define a space between said outer surface and said inside wall, wherein any point on the surface of the solid reagent is separated from the inside wall, means for connecting said reaction chamber to a source of a reagent gas which is reversibly reactable with said solid reagent and which causes thereby a variation in volume of said solid reagent, and a heat conductive, fluid contact material disposed in at least a portion of the space defined between said outer surface and said inside wall, said fluid contact material being chemically inert relative to said solid reagent and being variable in shape in response to the variation in volume of said solid reagent.

2. The reactor of claim 1, wherein any point on the surface of said solid reagent is separated from said inside wall by a mean distance of between 1 and 10 mm.

3. The reactor of claim 1, wherein said fluid contact material is graphite in powder or pellet form.

4. The reactor of claim 3, wherein said graphite is natural graphite.

5. The reactor of claim 1, wherein said fluid contact material is a metal powder in pellet form or atomized form.

6. The reactor of claim 3, wherein said graphite in powder or pellet form has an apparent density of between 0.5 and 1.0 $g/cm^3$.

7. The reactor of claim 6, wherein the apparent density of said graphite in powder or pellet form is between 0.6 and 0.8 $g/cm^3$.

8. The reactor of claim 1, wherein the solid reagent and the inside wall have a heat transfer coefficient therebetween greater than 50 $W/m^2 \cdot K$.

9. The reactor of claim 1, wherein said solid reagent is in block form.

10. A reactor for a chemical heat pump comprising a sealed container including an inside wall defining a reaction chamber, a heat exchange means in communication with said inside wall, a solid reagent having an outer surface disposed in said reaction chamber and having dimensions so as to define a space between said outer surface and said inside wall, means for connecting said reaction chamber to a source of a reagent gas which is reversibly reactable with said solid reagent and which causes thereby a variation in volume of said solid reagent, and a heat conductive, fluid contact material disposed in at least a portion of the space defined between said outer surface and said inside wall, said fluid contact material being chemically inert relative to said solid reagent and being variable in shape in response to the variation in volume of said solid reagent, said solid reagent being provided with a device for confining said contact material.

11. In a process for generating heat with a chemical heat pump comprising disposing a solid reagent having an outer surface in a reaction chamber defined by an inside wall of a sealed container and having heat exchange means in communication with the inside wall, and reacting said solid reagent with a reagent gas in a reversible reaction causing a variation in volume of said solid reagent, the improvement comprising forming said reagent with dimensions such that a space is defined between the outer surface of the solid reagent and the inside wall, wherein any point on the surface of the solid reagent is separated from the inside wall, and disposing in at least part of the space a heat conductive fluid contact material which is chemically inert relative to the solid reagent and which is variable in shape in response to the variation in volume of said solid reagent.

12. The process of claim 11, wherein the solid reagent and the inside wall have a heat transfer coefficient therebetween greater than 50 $W/m^2 \cdot K$.

13. The process of claim 11, wherein said solid reagent is in block form.

* * * * *